(12) United States Patent
Wang et al.

(10) Patent No.: US 9,264,367 B2
(45) Date of Patent: Feb. 16, 2016

(54) METHOD AND SYSTEM FOR CONTROLLING PACKET TRAFFIC

(71) Applicant: Huawei Technologies Co., LTD, Shenzhen (CN)

(72) Inventors: Changhong Wang, Shenzhen (CN); Lue Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 13/901,842

(22) Filed: May 24, 2013

(65) Prior Publication Data

US 2013/0336125 A1 Dec. 19, 2013

(30) Foreign Application Priority Data

May 25, 2012 (CN) .......................... 2012 1 0165662

(51) Int. Cl.
*H04L 12/819* (2013.01)
*H04L 12/833* (2013.01)

(52) U.S. Cl.
CPC .............. *H04L 47/215* (2013.01); *H04L 47/31* (2013.01)

(58) Field of Classification Search
None
See application file for complete search history.

(56) References Cited

U.S. PATENT DOCUMENTS

| 8,699,345 B2* | 4/2014 | Fukuchi ........................ 370/235 |
| 2002/0087715 A1* | 7/2002 | De Cnodder et al. ......... 709/235 |
| 2003/0095551 A1* | 5/2003 | Gotoh ..................... H04L 47/10 370/395.3 |
| 2005/0135378 A1* | 6/2005 | Rabie et al. ............... 370/395.21 |
| 2006/0104216 A1* | 5/2006 | O'Keeffe et al. .............. 370/252 |
| 2007/0153682 A1* | 7/2007 | Swenson et al. .............. 370/229 |
| 2007/0223375 A1* | 9/2007 | Ohta et al. ..................... 370/230 |
| 2008/0298243 A1* | 12/2008 | Martinotti et al. ............ 370/235 |
| 2008/0310307 A1* | 12/2008 | Yeom ............................. 370/235 |
| 2011/0299397 A1* | 12/2011 | Fukuchi ..................... 370/235.1 |
| 2012/0051372 A1* | 3/2012 | Nishimura .................... 370/474 |

FOREIGN PATENT DOCUMENTS

| CN | 102035732 A | 4/2011 |
| EP | 2466824 A1 | 6/2012 |

OTHER PUBLICATIONS

"Ethernet Services Attributes Phase I," Metro Ethernet Forum, Technical Specification MEF 10, Nov. 2004, 37 pages.

Heinanen, J. et al., "A Single Rate Three Color Marker," Network Working Group Request for Comments: 2697, University of Pennsylvania, Sep. 1999, pp. 1-6.

Heinanen, J. et al., "A Two Rate Three Color Marker," Network Working Group Request for Comments: 2698, University of Pennsylvania, Sep. 1999, pp. 1-5.

(Continued)

*Primary Examiner* — Hassan Kizou
*Assistant Examiner* — Roberta A Shand
(74) *Attorney, Agent, or Firm* — Slater & Matsil, L.L.P.

(57) ABSTRACT

The present invention applies to the field of communications technologies and provides a method and a system for controlling packet traffic. The method includes: comparing the number of tokens in a token bucket at a current time point with a length of a packet to be sent and a preset virtual threshold when the packet to be sent is received, refreshing the current number of tokens in the token bucket according to a comparison result, and marking the packet to be sent with a color.

4 Claims, 8 Drawing Sheets

(56) References Cited

OTHER PUBLICATIONS

Chinese Office Action received in Application No. 201210165662.5 mailed May 6, 2014, 8 pages.

Li, et al., "Comparison Between Token Bucket Algorithms in QoS Technology," ZTE Communications, Jun. 2007, vol. 13, No. 3, 9 pages. (Partial Translation).

* cited by examiner

METHOD AND SYSTEM FOR CONTROLLING PACKET TRAFFIC

CROSS-REFERENCE TO RELATED APPLICATION

This application claims priority to Chinese Patent Application No. 201210165662.5, filed on May 25, 2012, which is hereby incorporated by reference in its entirety.

FIELD OF THE INVENTION

The present invention relates to the field of communications technologies, and in particular to a method and a system for controlling packet traffic.

BACKGROUND OF THE INVENTION

In modern communications technologies, based on a rapid increase in IP traffic, a QoS technology emerges to ensure user experience of a quality of service (Quality of Service, QoS) and becomes increasingly important. Traffic control is one of main technical means for implementing QoS. In a network processor chip, a user provides differentiated access rates and access bandwidths for users at different service levels through flexible configuration. Basically, in an existing traffic control technology, a token bucket algorithm is used as a basis, and common token bucket algorithms are a single rate three color mark algorithm (Single Rate Three Color Mark, SrTCM) in IETF RFC2697, a two rate three color mark algorithm (Two Rate Three Color Mark, TrTCM) in RFC2698, and an MEF10 algorithm evolved from the two algorithms.

The SrTCM is taken as an example. In this algorithm, three parameters are defined: a committed information rate (Committed Information Rate, CIR), a committed burst size (Committed Burst Size, CBS), and an excess burst size (Excess Burst Size, EBS). Generally, a structure of two buckets, that is, a C bucket and an E bucket, is set. A maximum depth of the C bucket is the CBS, a maximum depth of the E bucket is the EBS, and a token is generated only at a CIR rate. A token is firstly added to the C bucket, and CIR tokens are generated in a unit time; after the C bucket is full, a token is added to the E bucket; and when both the C bucket and the E bucket are filled up, a newly generated token will be discarded, and the number of tokens in the buckets no longer increases.

In color-blind mode, it is assumed that a packet length of an ingress is L, the number of tokens in the C bucket is Tc, and the number of tokens in the E bucket is Te, if L<Tc, a packet is marked with green, and the number of tokens in the C bucket is reduced by L;

if Tc<L<Te, the packet is marked with yellow, and the number of tokens in the E bucket is reduced by L; and if Te<L, the packet is marked with red, and both the number of tokens in the C bucket and the number of tokens in the E bucket are not reduced.

For example, at a time point t0, the number of tokens in the C bucket and the number of tokens in the E bucket are represented by using Tc(t0) and Te(t0), respectively. It is assumed that at a time point t1, a next data packet arrives. In this case, the number of increased tokens (assuming that the C bucket is not full) is $\Delta T \times CIR$ within time $\Delta T$ (t1-t0). During design implementation, each time when a data packet arrives, the number of increased tokens and the number of tokens that needs to be subtracted when a packet passes need to be recalculated, and the current number of tokens in the C bucket and the current number of tokens in the E bucket are refreshed. Meanwhile, different colors are marked on packets. A processing procedure in color-aware mode is similar to that in color-blind mode, which is not repeated herein.

It can be seen from the foregoing traffic control process that when the total length of packets that arrive at an ingress within a unit time is greater than a CIR, because a speed of accumulating tokens is less than traffic when data arrives, according to the foregoing control result, a problem that most (even all) packets marked with green are short packets and most (even all) packets marked with red are long packets may occur. However, in an actual product application, a red packet is generally discarded. Therefore, the foregoing token bucket algorithm causes a problem that traffic imbalance occurs to long and short packets that have undergone traffic control.

SUMMARY OF THE INVENTION

A purpose of embodiments of the present invention is to provide a method for controlling packet traffic, which aims at resolving a problem that traffic imbalance occurs to long and short packets that have undergone traffic control and that cannot be resolved in a traffic control process by using a token bucket algorithm in the prior art.

An embodiment of the present invention provides a method for controlling packet traffic, where the method includes:

comparing the number of tokens in a token bucket at a current time point with a length of a packet to be sent and a preset virtual threshold when the packet to be sent is received, refreshing the current number of tokens in the token bucket according to a comparison result, and marking the packet to be sent with a color.

An embodiment of the present invention further provides a system for controlling packet traffic, where the system includes:

a control unit, configured to compare the number of tokens in a token bucket at a current time point with a length of a packet to be sent and a preset virtual threshold when the packet to be sent is received, refresh the current number of tokens in the token bucket according to a comparison result, and mark the packet to be sent with a color.

Compared with the prior art, beneficial effects of the embodiments of the present invention are as follows: The number of tokens in a token bucket at a current time point is compared with a length of a packet to be sent and a preset virtual threshold when the packet to be sent is received; the current number of tokens in the token bucket is refreshed according to a comparison result; and the packet to be sent is marked with a color. In this way, in a traffic control process, flexible balance control for traffic of packets with various lengths is implemented by adjusting the preset virtual threshold, thereby reaching a passing ratio of long packets to short packets, where the passing ratio is closest to a requirement of a customer, and in the control process, few chip resources are occupied, an implementation cost is low, and flexibility is high. Meanwhile, traffic control accuracy and a traffic control speed are effectively ensured.

BRIEF DESCRIPTION OF THE DRAWINGS

To describe the technical solutions in the embodiments of the present invention more clearly, the accompanying drawings for describing the embodiments are briefly introduced in the following. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the present invention more comprehensible, the present invention is further described in detail in the following with reference to the accompanying drawings and embodiments. It is understandable that the specific embodiments to be described herein are merely used to explain the present invention but are not intended to limit the present invention.

An embodiment of the present invention provides a method for controlling packet traffic, where the method includes: comparing the number of tokens in a token bucket at a current time point with a length of a packet to be sent and a preset virtual threshold when the packet to be sent is received, refreshing the current number of tokens in the token bucket according to a comparison result, and marking the packet to be sent with a color.

An embodiment of the present invention further provides a system for controlling packet traffic, where the system includes:

a control unit, configured to compare the number of tokens in a token bucket at a current time point with a length of a packet to be sent and a preset virtual threshold when the packet to be sent is received, refresh the current number of tokens in the token bucket according to a comparison result, and mark the packet to be sent with a color.

Implementation of the present invention is described in detail in the following with reference to the specific embodiments.

Embodiment 1

Figure 1:
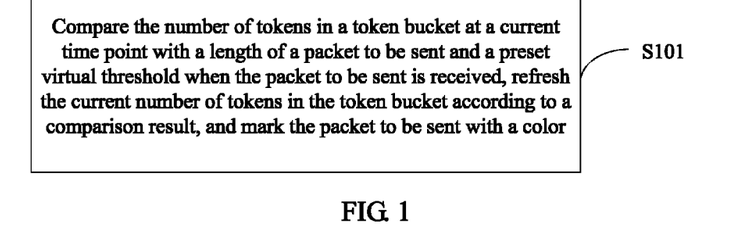
FIG. 1 is a flowchart of implementation of a method for controlling packet traffic according to Embodiment 1 of the present invention.

FIG. 1 is a flowchart of implementation of a method for controlling packet traffic according to Embodiment 1 of the present invention, and a detailed description is as follows:

In S101, compare the number of tokens in a token bucket at a current time point with a length of a packet to be sent and a preset virtual threshold when the packet to be sent is received, refresh the current number of tokens in the token bucket according to a comparison result, and mark the packet to be sent with a color.

In this embodiment, the number of tokens in the token bucket at the current time point is the number of tokens remained in the token bucket after a previous packet passes plus the number of tokens increased within an interval between a current packet and the previous packet.

In this embodiment, before S101, configuration of the preset virtual threshold is further included, and the following configuration method may specifically be adopted: Configure that the preset virtual threshold is the same as a maximum depth of the token bucket; alternatively, configure the preset virtual threshold according to an actual requirement of a user, such as a passing ratio of long packets to short packets, where the passing ratio is required by a customer.

In this embodiment, in a process of designing architecture of a traffic control algorithm chip, the preset virtual threshold may be implemented by using one or more registers, a user may configure the preset virtual threshold by configuring thresholds of these registers without adding a complex circuit and on-chip and off-chip storage resources. Therefore, a chip cost is significantly reduced. In addition, an algorithm in a chip is slightly changed, and therefore a speed of circuit design is not affected, and a delay of a traffic control circuit does not increase.

In an actual algorithm chip or a communications product, a preset virtual threshold may be unified, according to a condition of a design resource, as a global variable for controlling all algorithm circuits, and multiple preset virtual thresholds may be set for different algorithms to separately control different algorithm circuits.

In this embodiment, when the preset virtual threshold is configured to 0, an original algorithm may be restored. Compatibility is good and it is convenient for a user to use.

In this embodiment, the number of tokens in a token bucket at a current time point is compared with a length of a packet to be sent and a preset virtual threshold when the packet to be sent is received; the current number of tokens in the token bucket is refreshed according to a comparison result; and the packet to be sent is marked with a color. In this way, in a traffic control process, flexible balance control for traffic of packets with various lengths is implemented by adjusting the preset virtual threshold, thereby reaching a passing ratio of long packets to short packets, where the passing ratio is closest to a requirement of a customer, and in the control process, few chip resources are occupied, an implementation cost is low, and flexibility is high. Meanwhile, traffic control accuracy and a traffic control speed are effectively ensured.

Embodiment 2

Figure 2:
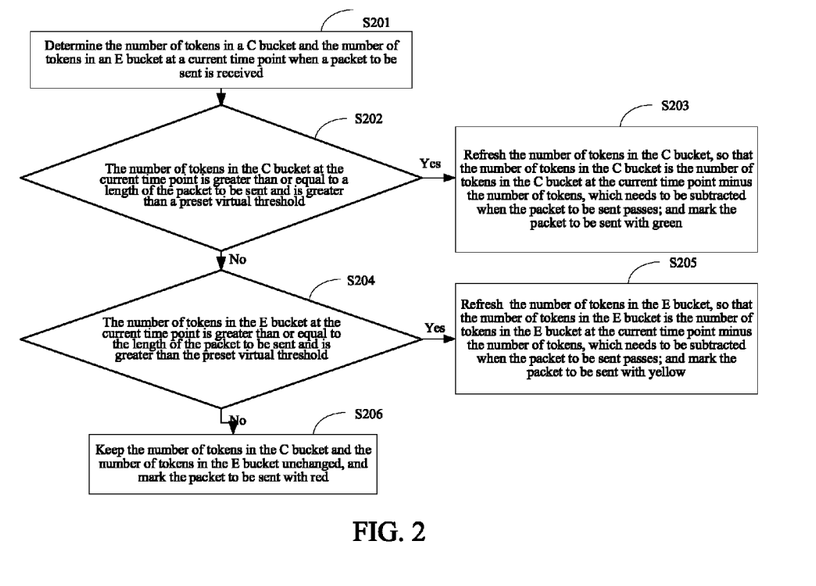
FIG. 2 is a flowchart of implementation of a method for controlling packet traffic according to Embodiment 2 of the present invention.

When a token bucket algorithm is an SrTCM algorithm in color-blind mode or an MEF10 algorithm in color-blind mode, a flowchart of implementation of a method for controlling packet traffic according to Embodiment 2 of the present invention is shown in FIG. 2, and a detailed description is as follows:

In S201, determine the number of tokens in a C bucket and the number of tokens in an E bucket at a current time point when a packet to be sent is received.

In this embodiment, when the token bucket algorithm is the SrTCM algorithm in color-blind mode, the number of tokens in the C bucket and the number of tokens in the E bucket at the current time point may specifically be determined by using the following manner:

$$T_C(t_j)=\min\{CBS, B_C(t_{j-1})+CIR\times(t_j-t_{j-1})\}$$

$$O(t_j)=\max\{0, B_C(t_{j-1})+CIR\times(t_1-t_{j-1})-CBS\}$$

$$T_e(t_j)=\min\{EBS, T_e(t_{j-1})+O(t_j)\}$$

$T_C(t_j)$ indicates the number of tokens in the C bucket at a time point $t_j$; $T_e(t_j)$ indicates the number of tokens in the E bucket at the time point $t_j$; and $O(t_j)$ indicates the number of tokens overflowed from the C bucket at the time point $t_j$.

When the token bucket algorithm is the MEF10 algorithm in color-blind mode, the number of tokens in the C bucket and the number of tokens in the E bucket at the current time point may specifically be determined by using the following manner.

$$B_C(t_j)=\min\{CBS, B_C(t_{j-1})+CIR/8\times(t_j-t_{j-1})\}$$

$$O(t_j)=\min\{0, B_C(t_{j-1})+CIR/8\times(t_j-t_{j-1})-CBS\}$$

$$B_e(t_j)=\min\{EBS, B_e(t_{j-1})+EIR/8\times(t_j-t_{j-1})-CF\times O(t_j)\}$$

$B_C(t_j)$ indicates the number of tokens in the C bucket at a time point $t_j$; $B_e(t_j)$ indicates the number of tokens in the E bucket at the time point $t_j$; $O(t_j)$ indicates the number of tokens overflowed from the C bucket at the time point $t_j$; CIR indicates a speed of adding a token to the C bucket; and EIR indicates a speed of adding a token to the E bucket; and CF is a parameter that needs to be configured according to the MEF10 algorithm. When CF=1 and EIR=0, the MEF10 algorithm is equivalent to the SrTCM algorithm. A CF value is specifically selected by a user. The CF value may be set to 0 or 1. When the CF value is set to 0, it can be known according to the algorithm that accumulation of the number of tokens in the E bucket is related to only EIR; and when the CF value is set to 1, the accumulation of the number of tokens in the E bucket is related to both EIR and CIR (a token overflowed from the C bucket is added to the E bucket).

In S202, determine whether the number of tokens in the C bucket at the current time point is greater than or equal to a length of the packet to be sent and is greater than a preset virtual threshold. If yes, perform S203; and if no, perform S204.

In this embodiment, perform S203 when it is determined that the number of tokens in the C bucket at the current time point is greater than or equal to the length of the packet to be sent and is greater than the preset virtual threshold, and perform S204 when it is determined that the number of tokens in the C bucket at the current time point is not greater than or equal to the length of the packet to be sent and/or the number of tokens in the C bucket at the current time point is not greater than the preset virtual threshold.

In S203, refresh the number of tokens in the C bucket, so that the number of tokens in the C bucket is the number of tokens in the C bucket at the current time point minus the number of tokens, which needs to be subtracted when the packet to be sent passes; and mark the packet to be sent with green.

In S204, determine whether the number of tokens in the E bucket at the current time point is greater than or equal to the length of the packet to be sent and is greater than the preset virtual threshold. If yes, perform S205; and if no, perform S206.

In this embodiment, perform S205 when it is determined that the number of tokens in the E bucket at the current time point is greater than or equal to the length of the packet to be sent and is greater than the preset virtual threshold; and perform S206 when it is determined that the number of tokens in the E bucket at the current time point is not greater than or equal to the length of the packet to be sent and/or the number of tokens in the E bucket at the current time point is not greater than the preset virtual threshold.

In S205, refresh the number of tokens in the E bucket, so that the number of tokens in the E bucket is the number of tokens in the E bucket at the current time point minus the number of tokens, which needs to be subtracted when the packet to be sent passes; and mark the packet to be sent with yellow.

In S206, keep the number of tokens in the C bucket and the number of tokens in the E bucket unchanged and mark the packet to be sent with red.

To facilitate understanding, the method for controlling traffic in this embodiment is described in the following by using a specific implementation example, but the present invention is not limited to a condition of this implementation example. It should be noted that in this implementation example, a traffic model is simplified for describing the present invention more clearly, and a traffic model in an actual application scenario may be different from this traffic model and is more complex.

Assuming that a token bucket algorithm in a current traffic control process adopts an SrTCM algorithm in color-blind mode, CBS=10 Bytes, EBS=10 Bytes, CIR=1 Bps, ingress data traffic is 5 Bps, and long and short packets are even (that is, packets with lengths of 2B and 8B arrive alternately at a rate of one packet every two seconds), and assuming that the preset virtual threshold is 8, a condition that an egress packet is marked with a color according to a traffic control method in the prior art is shown in Table 1, and a condition that an egress packet is marked with a color according to a traffic control method in the technical solution of this embodiment is shown in Table 2.

TABLE 1

| Time Point | Ingress Packet Length | Number of Tokens Remained in the C Bucket (Byte) | Number of Tokens Remained in the E Bucket (Byte) | Egress Packet Color |
|---|---|---|---|---|
| 0 | Long packet (8 Byte) | 2 | 10 | Green |
| 1 | Short packet (2 Byte) | 0 | 10 | Green |
| 2 | Long packet (7 Byte) | 1 | 3 | Yellow |
| 3 | Short packet (3 Byte) | 2 | 0 | Yellow |
| 4 | Long packet (6 Byte) | 3 | 0 | Red |
| 5 | Short packet (4 Byte) | 0 | 0 | Green |
| 6 | Long packet (8 Byte) | 1 | 0 | Red |
| 7 | Short packet (2 Byte) | 0 | 0 | Green |
| 8 | Long packet (7 Byte) | 1 | 0 | Red |
| 9 | Short packet (3 Byte) | 2 | 0 | Red |
| 10 | Long packet (6 Byte) | 3 | 0 | Red |
| 11 | Short packet (4 Byte) | 0 | 0 | Green |
| 12 | Long packet (8 Byte) | 1 | 0 | Red |
| 13 | Short packet (2 Byte) | 2 | 0 | Red |

TABLE 2

| Time Point | Ingress Packet Length | Number of Tokens Remained in the C Bucket (Byte) | Number of Tokens Remained in the E Bucket (Byte) | Egress Packet Color |
|---|---|---|---|---|
| 0 | Long packet (8 Byte) | 2 | 10 | Green |
| 1 | Short packet (2 Byte) | 2 | 8 | Yellow |

TABLE 2-continued

| Time Point | Ingress Packet Length | Number of Tokens Remained in the C Bucket (Byte) | Number of Tokens Remained in the E Bucket (Byte) | Egress Packet Color |
|---|---|---|---|---|
| 2 | Long packet (7 Byte) | 3 | 1 | Yellow |
| 3 | Short packet (3 Byte) | 4 | 1 | Red |
| 4 | Long packet (6 Byte) | 5 | 1 | Red |
| 5 | Short packet (4 Byte) | 6 | 1 | Red |
| 6 | Long packet (8 Byte) | 7 | 1 | Red |
| 7 | Short packet (2 Byte) | 6 | 1 | Green |
| 8 | Long packet (7 Byte) | 7 | 1 | Red |
| 9 | Short packet (3 Byte) | 5 | 1 | Green |
| 10 | Long packet (6 Byte) | 6 | 1 | Red |
| 11 | Short packet (4 Byte) | 7 | 1 | Red |
| 12 | Long packet (8 Byte) | 0 | 1 | Green |
| 13 | Short packet (2 Byte) | 1 | 1 | Red |

It can be seen from Table 1 that, after traffic control is performed by using the traffic control method in the prior art, green packets are mostly short packets, and packets marked with red are mostly long packets, which causes a problem that traffic imbalance occurs to long packets and short packets that have undergone traffic control. It can be seen from Table 2 that after traffic control is performed by using the traffic control method in this embodiment, long packets and short packets can be marked with green in a balanced manner through traffic control.

In this embodiment, when a token bucket algorithm is an SrTCM algorithm in color-blind mode or an MEF10 algorithm in color-blind mode, the number of tokens in a C bucket and the number of tokens in an E bucket are compared with a length of a packet to be sent and a preset virtual threshold, so that in a traffic control process, flexible balance control for traffic of packets with various lengths is implemented by adjusting the preset virtual threshold.

Embodiment 3

Figure 3:
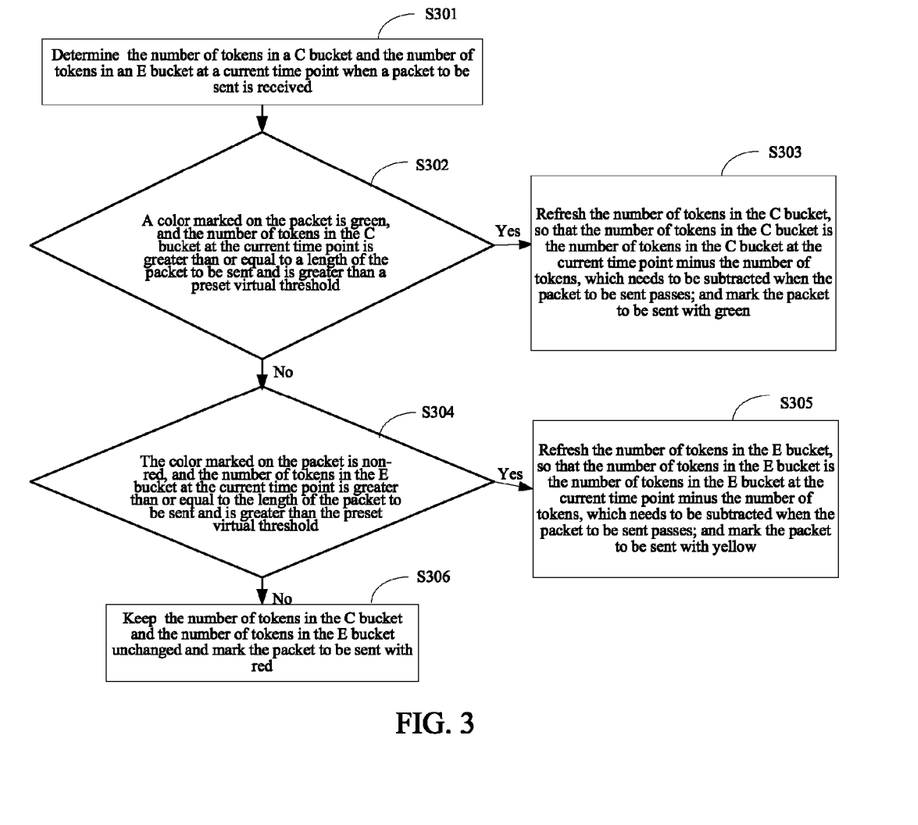
FIG. 3 is a flowchart of implementation of a method for controlling packet traffic according to Embodiment 3 of the present invention.

When a token bucket algorithm is an SrTCM algorithm in color-aware mode or an MEF10 algorithm in color-aware mode, in color-aware mode, a packet that passes through a token bucket originally carries color information, including three colors, that is, green, yellow, and red. A flowchart of implementation of a method for controlling packet traffic according to Embodiment 3 of the present invention is shown in FIG. 3, and a detailed description is as follows:

In S301, determine the number of tokens in a C bucket and the number of tokens in an E bucket at a current time point when a packet to be sent is received.

In this embodiment, a process of implementing S301 is similar to that of S201. For a specific description, reference is made to S201, which is not repeated herein.

In S302, determine whether a color marked on the packet is green, and whether the number of tokens in the C bucket at the current time point is greater than or equal to a length of the packet to be sent and is greater than a preset virtual threshold. If yes, perform S303; and if no, perform S304.

In this embodiment, perform S303 when it is determined that the color marked on the packet is green and the number of tokens in the C bucket at the current time point is greater than or equal to the length of the packet to be sent and is greater than the preset virtual threshold; and perform S304 when it is determined that the color marked on the packet is not green and the number of tokens in the C bucket at the current time point is not greater than or equal to the length of the packet to be sent and/or the number of tokens in the C bucket at the current time point is not greater than the preset virtual threshold.

In S303, refresh the number of tokens in the C bucket, so that the number of tokens in the C bucket is the number of tokens in the C bucket at the current time point minus the number of tokens, which needs to be subtracted when the packet to be sent passes; and mark the packet to be sent with green.

In S304, determine whether the color marked on the packet is non-red, and whether the number of tokens in the E bucket at the current time point is greater than or equal to the length of the packet to be sent and is greater than the preset virtual threshold. If yes, perform S305; and if no, perform S306.

In this embodiment, perform S305 when it is determined that the color marked on the packet is non-red and the number of tokens in the E bucket at the current time point is greater than or equal to the length of the packet to be sent and is greater than the preset virtual threshold; and perform S306 when it is determined that the color marked on the packet is not non-red and the number of tokens in the E bucket at the current time point is not greater than or equal to the length of the packet to be sent and/or the number of tokens in the E bucket at the current time point is not greater than the preset virtual threshold.

In S305, refresh the number of tokens in the E bucket, so that the number of tokens in the E bucket is the number of tokens in the E bucket at the current time point minus the number of tokens, which needs to be subtracted when the packet to be sent passes; and mark the packet to be sent with yellow.

In S306, keep the number of tokens in the C bucket and the number of tokens in the E bucket unchanged and mark the packet to be sent with red.

In this embodiment, when a token bucket algorithm is an SrTCM algorithm in color-aware mode or an MEF10 algorithm in color-aware mode, in color-aware mode, a color of an arrived packet is determined, and the number of tokens in a C bucket and the number of tokens in an E bucket are compared with a length of a packet to be sent and a preset virtual threshold, so that in a traffic control process, flexible balance control for traffic of packets with various lengths is implemented by adjusting the preset virtual threshold.

Embodiment 4

Figure 4:
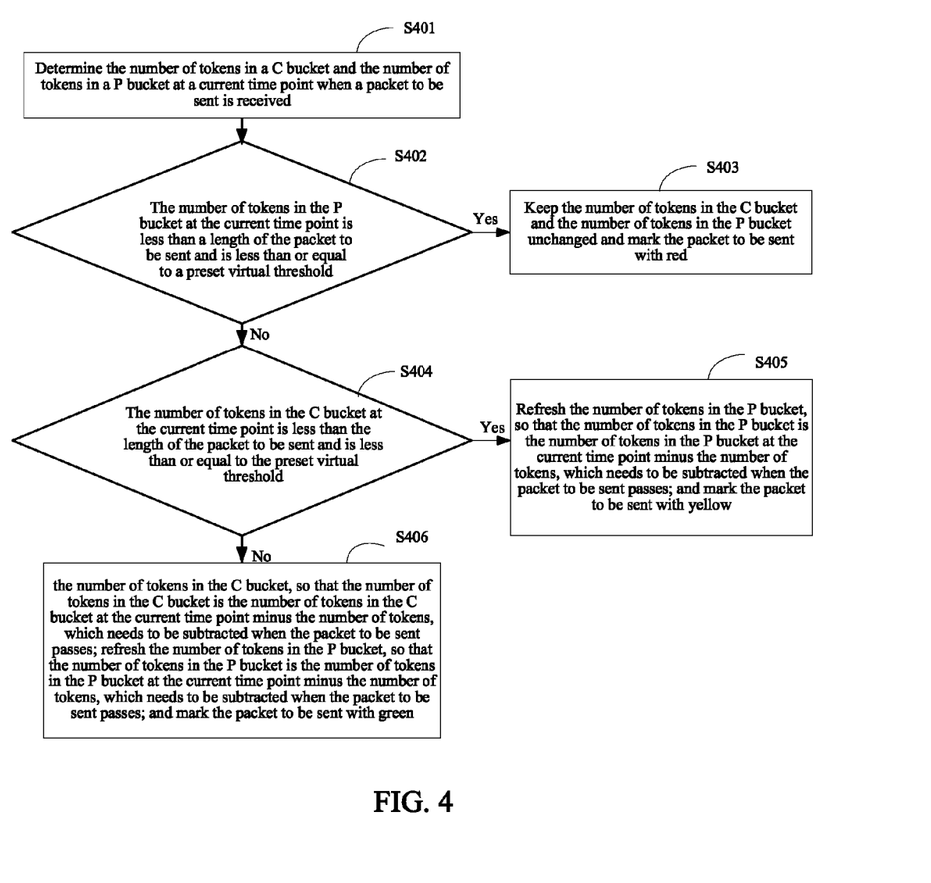
FIG. 4 is a flowchart of implementation of a method for controlling packet traffic according to Embodiment 4 of the present invention.

When a token bucket algorithm is a TrTCM algorithm in color-blind mode, a flowchart of implementation of a method for controlling packet traffic according to Embodiment 4 of the present invention is shown in FIG. 4, and a detailed description is as follows:

In S401, determine the number of tokens in a C bucket and the number of tokens in a P bucket at a current time point when a packet to be sent is received.

In this embodiment, when the token bucket algorithm is the TrTCM algorithm in color-blind mode, the number of tokens in the C bucket and the number of tokens in the P bucket at the current time point may specifically be determined by using the following manner:

$$T_C(t_j) = \min\{CBS, B_C(t_{j-1}) + CIR \times (t_j - t_{j-1})\}$$

$$O(t_j) = \min\{0, B_C(t_{j-1}) + CIR \times (t_j - t_{j-1}) - CBS\}$$

$$T_P(t_j) = \min\{PBS, T_P(t_{j-1}) + PIR \times (t_j - t_{j-1}) - O(t_j)\}$$

$T_C(t_j)$ indicates the number of tokens in the C bucket at a time point $t_j$; $T_P(t_j)$ indicates the number of tokens in the P bucket at the time point $t_j$; $O(t_j)$ indicates the number of tokens overflowed from the C bucket at the time point $t_j$; PBS indicates a maximum depth of the P bucket; CIR indicates a speed of adding a token to the C bucket; and PIR indicates a speed of adding a token to the P bucket.

In S402, determine whether the number of tokens in the P bucket at the current time point is less than a length of the packet to be sent and is less than or equal to a preset virtual threshold. If yes, perform S403; and if no, perform S404.

In this embodiment, perform S403 when it is determined that the number of tokens in the P bucket at the current time point is less than the length of the packet to be sent and is less than or equal to the preset virtual threshold; and perform S404 when it is determined that the number of tokens in the P bucket at the current time point is not less than the length of the packet to be sent and/or the number of tokens in the P bucket at the current time point is not less than or equal to the preset virtual threshold.

In S403, keep the number of tokens in the C bucket and the number of tokens in the P bucket unchanged and mark the packet to be sent with red.

In S404, determine whether the number of tokens in the C bucket at the current time point is less than the length of the packet to be sent and is less than or equal to the preset virtual threshold. If yes, perform S405; and if no, perform S406.

In this embodiment, perform S405 when it is determined that the number of tokens in the C bucket at the current time point is less than the length of the packet to be sent and is less than or equal to the preset virtual threshold; and perform S406 when it is determined that the number of tokens in the C bucket at the current time point is not less than the length of the packet to be sent and/or the number of tokens in the C bucket at the current time point is not less than or equal to the preset virtual threshold.

In S405, refresh the number of tokens in the P bucket, so that the number of tokens in the P bucket is the number of tokens in the P bucket at the current time point minus the number of tokens, which needs to be subtracted when the packet to be sent passes; and mark the packet to be sent with yellow.

In S406, refresh the number of tokens in the C bucket, so that the number of tokens in the C bucket is the number of tokens in the C bucket at the current time point minus the number of tokens, which needs to be subtracted when the packet to be sent passes; refresh the number of tokens in the P bucket, so that the number of tokens in the P bucket is the number of tokens in the P bucket at the current time point minus the number of tokens, which needs to be subtracted when the packet to be sent passes; and mark the packet to be sent with green.

In this embodiment, when a token bucket algorithm is a TrTCM algorithm in color-blind mode, the number of tokens in a C bucket and the number of tokens in a P bucket are compared with a length of a packet to be sent and a preset virtual threshold, so that in a traffic control process, flexible balance control for traffic of packets with various lengths is implemented by adjusting the preset virtual threshold.

Embodiment 5

Figure 5:
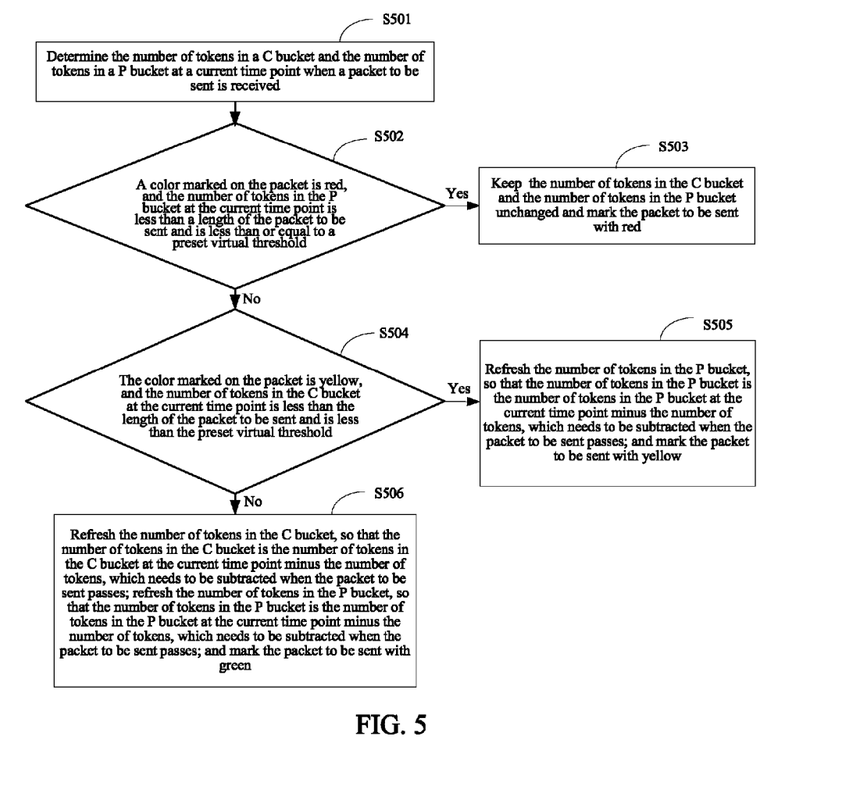
FIG. 5 is a flowchart of implementation of a method for controlling packet traffic according to Embodiment 5 of the present invention.

When a token bucket algorithm is a TrTCM algorithm in color-aware mode, a flowchart of implementation of a method for controlling packet traffic according to Embodiment 5 of the present invention is shown in FIG. 5, and a detailed description is as follows:

In S501, determine the number of tokens in a C bucket and the number of tokens in a P bucket at a current time point when a packet to be sent is received.

In this embodiment, a process of implementing S501 is similar to that of S401. For a specific description, reference is made to S401, which is not repeated herein.

In S502, determine whether a color marked on the packet is red, and whether the number of tokens in the P bucket at the current time point is less than a length of the packet to be sent and is less than or equal to a preset virtual threshold. If yes, perform S503; and if no, perform S504.

In this embodiment, perform S503 when it is determined that the color marked on the packet is red and the number of tokens in the P bucket at the current time point is less than the length of the packet to be sent and is less than or equal to the preset virtual threshold; and perform S504 when it is determined that the color marked on the packet is not red and the number of tokens in the P bucket at the current time point is not less than the length of the packet to be sent and/or the number of tokens in the P bucket at the current time point is not less than or equal to the preset virtual threshold.

In S503, keep the number of tokens in the C bucket and the number of tokens in the P bucket unchanged and mark the packet to be sent with red.

In S504, determine whether the color marked on the packet is yellow, and whether the number of tokens in the C bucket at the current time point is less than the length of the packet to be sent and is less than or equal to the preset virtual threshold. If yes, perform S505; and if no, perform S506.

In this embodiment, perform S505 when it is determined that the color marked on the packet is yellow and the number of tokens in the C bucket at the current time point is less than the length of the packet to be sent and is less than or equal to the preset virtual threshold; and perform S506 when it is determined that the color marked on the packet is not yellow and the number of tokens in the C bucket at the current time point is not less than the length of the packet to be sent and/or the number of tokens in the C bucket at the current time point is not less than or equal to the preset virtual threshold.

In S505, refresh the number of tokens in the P bucket, so that the number of tokens in the P bucket is the number of tokens in the P bucket at the current time point minus the number of tokens, which needs to be subtracted when the packet to be sent passes; and mark the packet to be sent with yellow.

In S506, refresh the number of tokens in the C bucket, so that the number of tokens in the C bucket is the number of tokens in the C bucket at the current time point minus the number of tokens, which needs to be subtracted when the packet to be sent passes; refresh the number of tokens in the P bucket, so that the number of tokens in the P bucket is the number of tokens in the P bucket at the current time point minus the number of tokens, which needs to be subtracted when the packet to be sent passes; and mark the packet to be sent with green.

In this embodiment, when a token bucket algorithm is a TrTCM algorithm in color-aware mode, a color of an arrived packet is determined, and the number of tokens in a C bucket and the number of tokens in a P bucket are compared with a length of a packet to be sent and a preset virtual threshold, so that in a traffic control process, flexible balance control for traffic of packets with various lengths is implemented by adjusting the preset virtual threshold.

Embodiment 6

Figure 6:
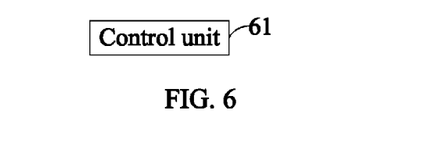
FIG. 6 is a structural diagram of a system for controlling packet traffic according to Embodiment 6 of the present invention.

FIG. 6 is a structural diagram of a system for controlling packet traffic according to Embodiment 6 of the present invention. To facilitate the description, only a part that relates to this embodiment of the present invention is shown.

A control unit 61 is configured to compare the number of tokens in a token bucket at a current time point with a length of a packet to be sent and a preset virtual threshold when the packet to be sent is received, refresh the current number of tokens in the token bucket according to a comparison result, and mark the packet to be sent with a color.

In this embodiment, the number of tokens in a token bucket at a current time point is compared with a length of a packet to be sent and a preset virtual threshold when the packet to be sent is received; the current number of tokens in the token bucket is refreshed according to a comparison result; and the packet to be sent is marked with a color. In this way, in a traffic control process, flexible balance control for traffic of packets with various lengths is implemented by adjusting the preset virtual threshold, thereby reaching a passing ratio of long packets to short packets, where the passing ratio is closest to a requirement of a customer, and in the control process, few chip resources are occupied, an implementation cost is low, and flexibility is high. Meanwhile, traffic control accuracy and a traffic control speed are effectively ensured.

The system for controlling packet traffic according to this embodiment of the present invention can be used in the corresponding method Embodiment 1. For a detailed description, reference is made to Embodiment 1, which is not repeated herein.

Embodiment 7

Figure 7:
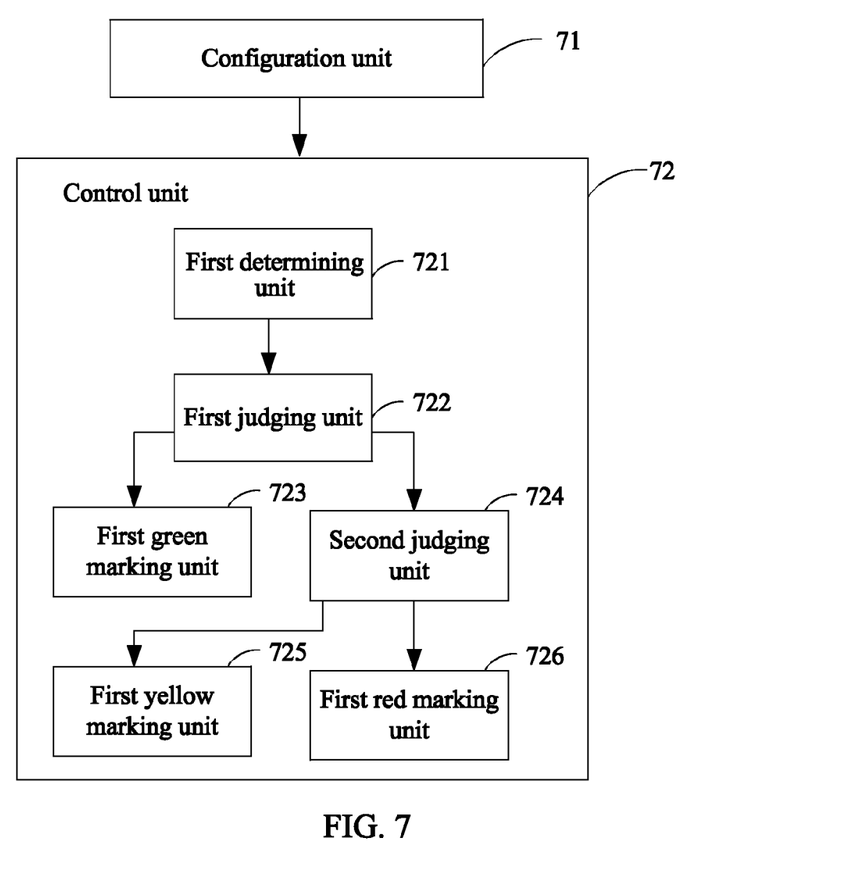
FIG. 7 is a structural diagram of a system for controlling packet traffic according to Embodiment 7 of the present invention.

FIG. 7 is a structural diagram of a system for controlling packet traffic according to Embodiment 7 of the present invention. To facilitate the description, only a part that relates to this embodiment of the present invention is shown.

The system includes:

a configuration unit 71, configured to perform configuration on a preset virtual threshold; and a control unit 72, configured to compare the number of tokens in a token bucket at a current time point with a length of a packet to be sent and the preset virtual threshold when the packet to be sent is received, refresh the current number of tokens in the token bucket according to a comparison result, and mark the packet to be sent with a color.

Optionally, when a token bucket algorithm is an SrTCM algorithm in color-blind mode or an MEF10 algorithm in color-blind mode, the control unit 72 includes:

a first determining unit 721, configured to determine the number of tokens in a C bucket and the number of tokens in an E bucket at the current time point when the packet to be sent is received;

a first judging unit 722, configured to determine whether the number of tokens in the C bucket at the current time point is greater than or equal to the length of the packet to be sent and is greater than the preset virtual threshold;

a first green marking unit 723, configured to, when it is determined that the number of tokens in the C bucket at the current time point is greater than or equal to the length of the packet to be sent and is greater than the preset virtual threshold, refresh the number of tokens in the C bucket, so that the number of tokens in the C bucket is the number of tokens in the C bucket at the current time point minus the number of tokens, which needs to be subtracted when the packet to be sent passes; and mark the packet to be sent with green;

a second judging unit 724, configured to, when it is determined that the number of tokens in the C bucket at the current time point is not greater than or equal to the length of the packet to be sent and is not greater than the preset virtual threshold, determine whether the number of tokens in the E bucket at the current time point is greater than or equal to the length of the packet to be sent and is greater than the preset virtual threshold;

a first yellow marking unit 725, configured to, when the number of tokens in the E bucket at the current time point is greater than or equal to the length of the packet to be sent and is greater than the preset virtual threshold, refresh the number of tokens in the E bucket, so that the number of tokens in the E bucket is the number of tokens in the E bucket at the current time point minus the number of tokens, which needs to be subtracted when the packet to be sent passes; and mark the packet to be sent with yellow; and a first red marking unit 726, configured to, when the number of tokens in the E bucket at the current time point is not greater than or equal to the length of the packet to be sent and is not greater than the preset virtual threshold, keep the number of tokens in the C bucket and the number of tokens in the E bucket unchanged and mark the packet to be sent with red.

The system for controlling packet traffic according to this embodiment of the present invention can be used in the corresponding method Embodiment 2. For a detailed description, reference is made to Embodiment 2, which is not repeated herein.

Embodiment 8

Figure 8:
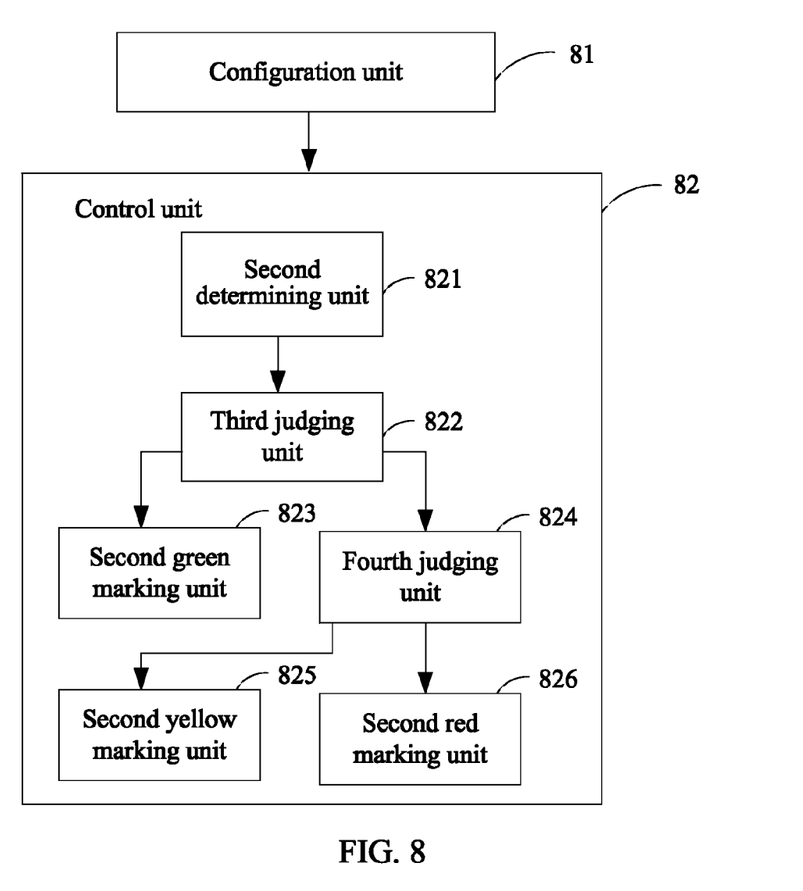
FIG. 8 is a structural diagram of a system for controlling packet traffic according to Embodiment 8 of the present invention.

FIG. 8 is a structural diagram of a system for controlling packet traffic according to Embodiment 8 of the present invention. To facilitate the description, only a part that relates to this embodiment of the present invention is shown.

The system includes: a configuration unit 81 and a control unit 82.

A difference between this embodiment and Embodiment 7 is as follows:

When a token bucket algorithm is an SrTCM algorithm in color-aware mode or an MEF10 algorithm in color-aware mode, the control unit 82 includes:

a second determining unit 821, configured to determine the number of tokens in a C bucket and the number of tokens in an E bucket at a current time point when a packet to be sent is received;

a third judging unit 822, configured to determine whether a color marked on the packet is green, and whether the number of tokens in the C bucket at the current time point is greater than or equal to a length of the packet to be sent and is greater than a preset virtual threshold;

a second green marking unit 823, configured to, when it is determined that the color marked on the packet is green and the number of tokens in the C bucket at the current time point is greater than or equal to the length of the packet to be sent and is greater than the preset virtual threshold, refresh the number of tokens in the C bucket, so that the number of tokens in the C bucket is the number of tokens in the C bucket at the current time point minus the number of tokens, which needs to be subtracted when the packet to be sent passes; and mark the packet to be sent with green;

a fourth judging unit 824, configured to, when it is determined that the color marked on the packet is non-green, the number of tokens in the C bucket at the current time point is not greater than or equal to the length of the packet to be sent and/or the number of tokens in the C bucket at the current time point is not greater than the preset virtual threshold, determine whether the color marked on the packet is non-red, and whether the number of tokens in the E bucket at the current time point is greater than or equal to the length of the packet to be sent and is greater than the preset virtual threshold;

a second yellow marking unit 825, configured to, when it is determined that the color marked on the packet is non-red, and the number of tokens in the C bucket at the current time point is greater than or equal to the length of the packet to be sent and is greater than the preset virtual threshold, refresh the number of tokens in the E bucket, so that the number of tokens in the E bucket is the number of tokens in the E bucket at the current time point minus the number of tokens, which needs to be subtracted when the packet to be sent passes; and mark the packet to be sent with yellow; and a second red marking unit 826, configured to, when it is determined that the color marked on the packet is not non-red, the number of tokens in the C bucket at the current time point is not greater than or equal to the length of the packet to be sent and/or the number of tokens in the C bucket at the current time point is not greater than the preset virtual threshold, keep the number of tokens in the C bucket and the number of tokens in the E bucket unchanged and mark the packet to be sent with red.

The system for controlling packet traffic according to this embodiment of the present invention can be used in the corresponding method Embodiment 3. For a detailed description, reference is made to Embodiment 3, which is not repeated herein.

Embodiment 9

Figure 9:
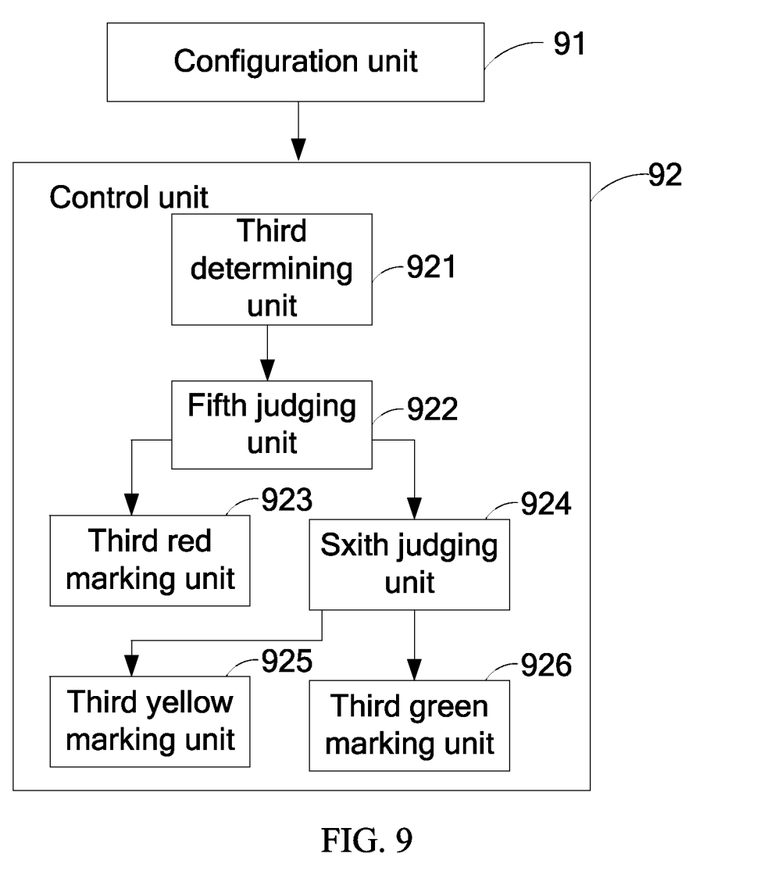
FIG. 9 is a structural diagram of a system for controlling packet traffic according to Embodiment 9 of the present invention.

FIG. 9 is a structural diagram of a system for controlling packet traffic according to Embodiment 9 of the present invention. To facilitate the description, only a part that relates to this embodiment of the present invention is shown.

The system includes: a configuration unit 91 and a control unit 92.

A difference between this embodiment and Embodiment 7 is as follows:

Optionally, when a token bucket algorithm is a TrTCM algorithm in color-blind mode, the control unit 92 includes:

a third determining unit 921, configured to determine the number of tokens in a C bucket and the number of tokens in a P bucket at a current time point when a packet to be sent is received;

a fifth judging unit 922, configured to determine whether the number of tokens in the P bucket at the current time point is less than a length of the packet to be sent and is less than or equal to a preset virtual threshold;

a third red marking unit 923, configured to, when it is determined that the number of tokens in the P bucket at the current time point is less than the length of the packet to be sent and is less than or equal to the preset virtual threshold, keep the number of tokens in the C bucket and the number of tokens in the P bucket unchanged and mark the packet to be sent with red;

a sixth judging unit 924, configured to, when it is determined that the number of tokens in the P bucket at the current time point is not less than the length of the packet to be sent and/or the number of tokens in the P bucket at the current time point is not less than or equal to the preset virtual threshold, determine whether the number of tokens in the C bucket at the current time point is less than the length of the packet to be sent and is less than or equal to the preset virtual threshold;

a third yellow marking unit 925, configured to, when it is determined that the number of tokens in the C bucket at the current time point is less than the length of the packet to be sent and is less than or equal to the preset virtual threshold, refresh the number of tokens in the P bucket, so that the number of tokens in the P bucket is the number of tokens in the P bucket at the current time point minus the number of tokens, which needs to be subtracted when the packet to be sent passes; and mark the packet to be sent with yellow; and a third green marking unit 926, configured to, when it is determined that the number of tokens in the C bucket at the current time point is not less than the length of the packet to be sent and/or the number of tokens in the C bucket at the current time point is not less than or equal to the preset virtual threshold, refresh the number of tokens in the C bucket, so that the number of tokens in the C bucket is the number of tokens in the C bucket at the current time point minus the number of tokens, which needs to be subtracted when the packet to be sent passes; refresh the number of tokens in the P bucket, so that the number of tokens in the P bucket is the number of tokens in the P bucket at the current time point minus the number of tokens, which needs to be subtracted when the packet to be sent passes; and mark the packet to be sent with green.

The system for controlling packet traffic according to this embodiment of the present invention can be used in the corresponding method Embodiment 4. For a detailed description, reference is made to Embodiment 4, which is not repeated herein.

Embodiment 10

Figure 10:
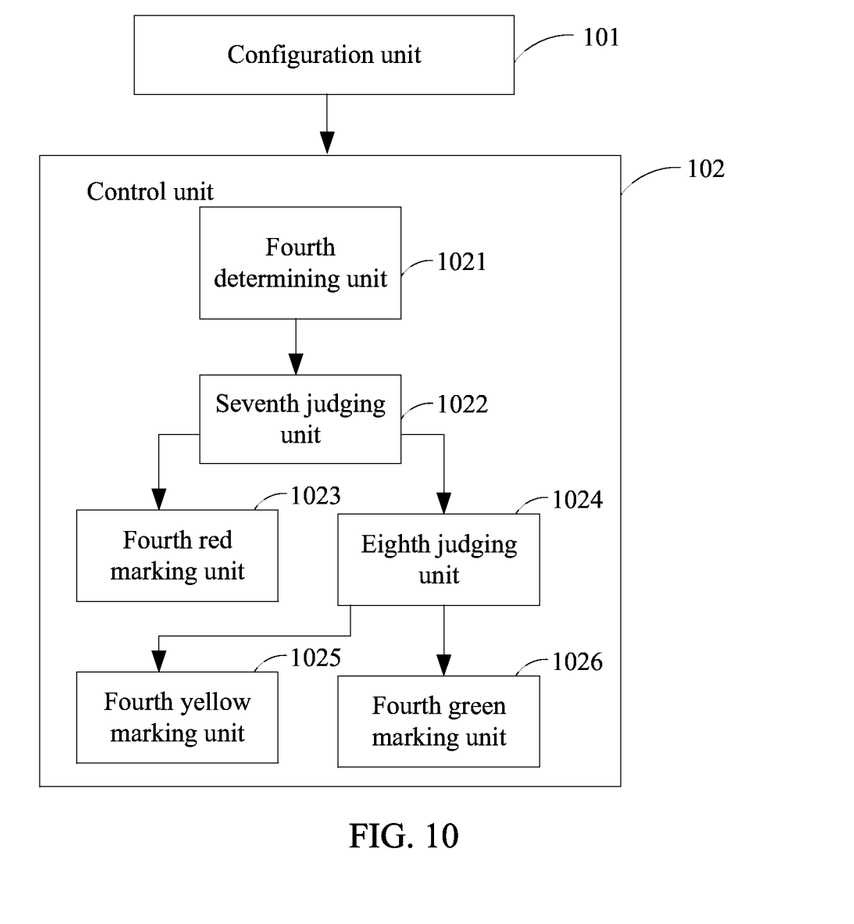
FIG. 10 is a structural diagram of a system for controlling packet traffic according to Embodiment 10 of the present invention.

FIG. 10 is a structural diagram of a system for controlling packet traffic according to Embodiment 10 of the present invention. To facilitate the description, only a part that relates to this embodiment of the present invention is shown.

The system includes: a configuration unit 101 and a control unit 102.

A difference between this embodiment and Embodiment 7 is as follows: Optionally, when a token bucket algorithm is a TrTCM algorithm in color-aware mode, the control unit 102 includes:

a fourth determining unit 1021, configured to determine the number of tokens in a C bucket and the number of tokens in a P bucket at a current time point when a packet to be sent is received;

a seventh judging unit 1022, configured to determine whether a color marked on the packet is red, and whether the number of tokens in the P bucket at the current time point is less than a length of the packet to be sent and is less than or equal to a preset virtual threshold;

a fourth red marking unit 1023, configured to, when it is determined that the color marked on the packet is red, and the number of tokens in the P bucket at the current time point is less than the length of the packet to be sent and is less than or equal to the preset virtual threshold, keep the number of tokens in the C bucket and the number of tokens in the P bucket unchanged and mark the packet to be sent with red;

an eighth judging unit 1024, configured to, when it is determined that the color marked on the packet is not red, the number of tokens in the P bucket at the current time point is not less than the length of the packet to be sent, and/or the number of tokens in the P bucket at the current time point is not less than or equal to the preset virtual threshold, determine whether the color marked on the packet is yellow, and whether the number of tokens in the C bucket at the current time point is less than the length of the packet to be sent and is less than or equal to the preset virtual threshold;

a fourth yellow marking unit 1025, configured to, when it is determined that the color marked on the packet is yellow and the number of tokens in the C bucket at the current time point is less than the length of the packet to be sent and is less than or equal to the preset virtual threshold, refresh the number of tokens in the P bucket, so that the number of tokens in the P bucket is the number of tokens in the P bucket at the current time point minus the number of tokens, which needs to be subtracted when the packet to be sent passes; and mark the packet to be sent with yellow; and a fourth green marking unit 1026, configured to, when it is determined that the color marked on the packet is not yellow, the number of tokens in the C bucket at the current time point is not less than the length of the packet to be sent, and/or the number of tokens in the C bucket at the current time point is not less than or equal to the preset virtual threshold, refresh the number of tokens in the C bucket, so that the number of tokens in the C bucket is the number of tokens in the C bucket at the current time point minus the number of tokens, which needs to be subtracted when the packet to be sent passes; refresh the number of tokens in the P bucket, so that the number of tokens in the P bucket is the number of tokens in the P bucket at the current time point minus the number of tokens, which needs to be subtracted when the packet to be sent passes; and mark the packet to be sent with green.

The system for controlling packet traffic according to this embodiment of the present invention can be used in the corresponding method Embodiment 5. For a detailed description, reference is made to Embodiment 5, which is not repeated herein.

It should be noted that in the foregoing system embodiments, all units included are classified according to only functional logic, but the present invention is not limited to the foregoing classification, as long as a corresponding function can be implemented. In addition, a specific name of each functional unit is used to distinguish each other only, but is not used to limit the protection scope of the present invention.

In addition, persons of ordinary skill in the art may understand that all or part of the steps of the method in the foregoing embodiments of the present invention may be implemented by a program instructing relevant hardware. The corresponding program may be stored in a computer readable storage medium, such as a ROM/RAM, a magnetic disk, or an optical disk.

The foregoing descriptions are merely exemplary embodiments of the present invention, but are not intended to limit the present invention. All modifications, equivalent replacements, and improvements made within the spirit and principle of the present invention shall fall within the protection scope of the present invention.

What is claimed is:

1. A system for controlling packet traffic, wherein a token bucket algorithm is an SrTCM algorithm in color-blind mode or an MEF10 algorithm in color-blind mode and wherein the system comprises:

a processor; and a computer-readable storage medium storing a program to be executed by the processor, the program including instructions for:

determining a number of tokens in a C bucket and a number of tokens in an E bucket at the current time point when the packet to be sent is received;

determining whether the number of tokens in the C bucket at the current time point is greater than or equal to the length of the packet to be sent and is greater than the preset virtual threshold;

refreshing, in response to determining that the number of tokens in the C bucket at the current time point is greater than or equal to the length of the packet to be sent and is greater than the preset virtual threshold, the number of tokens in the C bucket so that the number of tokens in the C bucket is the number of tokens in the C bucket at the current time point minus the number of tokens needed to be subtracted when the packet to be sent passes; and marking the packet to be sent with green;

determining, in response to determining that the number of tokens in the C bucket at the current time point is not greater than or equal to the length of the packet to be sent and is not greater than the preset virtual threshold, whether the number of tokens in the E bucket at the current time point is greater than or equal to the length of the packet to be sent and is greater than the preset virtual threshold;

refreshing, in response to determining that the number of tokens in the E bucket at the current time point is greater than or equal to the length of the packet to be sent and is greater than the preset virtual threshold, the number of tokens in the E bucket so that the number of tokens in the E bucket is the number of tokens in the E bucket at the current time point minus the number of tokens needed to be subtracted when the packet to be sent passes; and marking the packet to be sent with yellow; and keeping, in response to determining that the number of tokens in the E bucket at the current time point is not greater than or equal to the length of the packet to be sent and is not greater than the preset virtual threshold, the number of tokens in the C bucket and the number of tokens in the E bucket unchanged and marking the packet to be sent with red, wherein the preset virtual threshold is configured according to a target passing ratio of long packets to short packets.

2. A system for controlling packet traffic, wherein a token bucket algorithm is an SrTCM algorithm in color-aware mode or an MEF10 algorithm in color-aware mode and wherein the system comprises:

a processor; and a computer-readable storage medium storing a program to be executed by the processor, the program including instructions for:

determining a number of tokens in a C bucket and a number of tokens in an E bucket at the current time point when the packet to be sent is received;

determining whether a color marked on the packet is green and whether the number of tokens in the C bucket at the current time point is greater than or equal to the length of the packet to be sent and is greater than the preset virtual threshold;

refreshing, in response to determining that the color marked on the packet is green and the number of tokens in the C bucket at the current time point is greater than or equal to the length of the packet to be sent and is greater than the preset virtual threshold, the number of tokens in the C bucket so that the number of tokens in the C bucket is the number of tokens in the C bucket at the current time point minus the number of tokens needed to be subtracted when the packet to be sent passes, and marking the packet to be sent with green;

determining, in response to determining that the color marked on the packet is non-green, the number of tokens in the C bucket at the current time point is not greater than or equal to the length of the packet to be sent or the number of tokens in the C bucket at the current time point is not greater than the preset virtual threshold, whether the color marked on the packet is non-red and whether the number of tokens in the E bucket at the current time point is greater than or equal to the length of the packet to be sent and is greater than the preset virtual threshold;

refreshing, in response to determining that the color marked on the packet is non-red and the number of tokens in the C bucket at the current time point is greater than or equal to the length of the packet to be sent and is greater than the preset virtual threshold, the number of tokens in the E bucket so that the number of tokens in the E bucket is the number of tokens in the E bucket at the current time point minus the number of tokens, needed to be subtracted when the packet to be sent passes, and marking the packet to be sent with yellow; and keeping, in response to determining that the color marked on the packet is not non-red, the number of tokens in the C bucket at the current time point is not greater than or equal to the length of the packet to be sent or the number of tokens in the C bucket at the current time point is not greater than the preset virtual threshold, the number of tokens in the C bucket and the number of tokens in the E bucket unchanged and mark the packet to be sent with red, wherein the preset virtual threshold is configured according to a target passing ratio of long packets to short packets.

3. A system for controlling packet traffic, wherein a token bucket algorithm is a TrTCM algorithm in color-blind mode and wherein the system comprises:

a processor; and a computer-readable storage medium storing a program to be executed by the processor, the program including instructions for:

determining the number of tokens in a C bucket and the number of tokens in a P bucket at the current time point when the packet to be sent is received;

determining whether the number of tokens in the P bucket at the current time point is less than the length of the packet to be sent and is less than or equal to the preset virtual threshold;

keeping, in response to determining that the number of tokens in the P bucket at the current time point is less than the length of the packet to be sent and is less than or equal to the preset virtual threshold, the number of tokens in the C bucket and the number of tokens in the P bucket unchanged and mark the packet to be sent with red;

determine, in response to determining that the number of tokens in the P bucket at the current time point is not less than the length of the packet to be sent or the number of tokens in the P bucket at the current time point is not less than or equal to the preset virtual threshold, whether the number of tokens in the C bucket at the current time point is less than the length of the packet to be sent and is less than or equal to the preset virtual threshold;

refreshing, in response to determining that the number of tokens in the C bucket at the current time point is less than the length of the packet to be sent and is less than or equal to the preset virtual threshold, the number of tokens in the P bucket, so that the number of tokens in the P bucket is the number of tokens in the P bucket at the current time point minus the number of tokens needed to be subtracted when the packet to be sent passes, and to mark the packet to be sent with yellow; and refreshing, in response to determining that the number of tokens in the C bucket at the current time point is not less than the length of the packet to be sent or the number of tokens in the C bucket at the current time point is not less than or equal to the preset virtual threshold, the number of tokens in the C bucket so that the number of tokens in the C bucket is the number of tokens in the C bucket at the current time point minus the number of tokens needed to be subtracted when the packet to be sent passes, to refresh the number of tokens in the P bucket, so that the number of tokens in the P bucket is the number of tokens in the P bucket at the current time point minus the number of tokens needed to be subtracted when the packet to be sent passes, and marking the packet to be sent with green, wherein the preset virtual threshold is configured according to a target passing ratio of long packets to short packets.

4. A system for controlling packet traffic, wherein a token bucket algorithm is a TrTCM algorithm in color-aware mode and wherein the system comprises:

a processor; and a computer-readable storage medium storing a program to be executed by the processor, the program including instructions for:

determining a number of tokens in a C bucket and a number of tokens in a P bucket at the current time point when the packet to be sent is received;

determining whether a color marked on the packet is red and whether the number of tokens in the P bucket at the current time point is less than the length of the packet to be sent and is less than or equal to the preset virtual threshold;

keeping, in response to determining that the color marked on the packet is red and the number of tokens in the P bucket at the current time point is less than the length of the packet to be sent and is less than or equal to the preset virtual threshold, the number of tokens in the C bucket and the number of tokens in the P bucket unchanged and mark the packet to be sent with red;

determining, in response to determining that the color marked on the packet is not red, the number of tokens in the P bucket at the current time point is not less than the length of the packet to be sent, or the number of tokens in the P bucket at the current time point is not less than or equal to the preset virtual threshold, determining whether the color marked on the packet is yellow and whether the number of tokens in the C bucket at the current time point is less than the length of the packet to be sent and is less than or equal to the preset virtual threshold;

refreshing, in response to determining that the color marked on the packet is yellow and the number of tokens in the C bucket at the current time point is less than the length of the packet to be sent and is less than or equal to the preset virtual threshold, refreshing the number of tokens in the P bucket so that the number of tokens in the P bucket is the number of tokens in the P bucket at the current time point minus the number of tokens needed to be subtracted when the packet to be sent passes, and marking the packet to be sent with yellow; and refreshing, in response to determining that the color marked on the packet is not yellow, the number of tokens in the C bucket at the current time point is not less than the length of the packet to be sent, or the number of tokens in the C bucket at the current time point is not less than or equal to the preset virtual threshold, the number of tokens in the C bucket so that the number of tokens in the C bucket is the number of tokens in the C bucket at the current time point minus the number of tokens needed to be subtracted when the packet to be sent passes, to refresh the number of tokens in the P bucket so that the number of tokens in the P bucket is the number of tokens in the P bucket at the current time point minus the number of tokens needed to be subtracted when the packet to be sent passes; and marking the packet to be sent with green, wherein the preset virtual threshold is configured according to a target passing ratio of long packets to short packets.

\* \* \* \* \*